(12) United States Patent
Li

(10) Patent No.: US 11,657,209 B2
(45) Date of Patent: May 23, 2023

(54) CONTEXT BASED VISUAL ENHANCEMENT SUGGESTION

(71) Applicant: Microsoft Technology Licensing, LLC, Redmond, WA (US)

(72) Inventor: Ji Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 17/232,503

(22) Filed: Apr. 16, 2021

(65) Prior Publication Data

US 2022/0335205 A1 Oct. 20, 2022

(51) Int. Cl.
*G06F 40/106* (2020.01)
*G06N 20/00* (2019.01)
*G06F 16/28* (2019.01)
*G06F 16/908* (2019.01)
*G06F 40/166* (2020.01)
*G06F 40/30* (2020.01)

(52) U.S. Cl.
CPC .......... *G06F 40/106* (2020.01); *G06F 16/288* (2019.01); *G06F 16/908* (2019.01); *G06F 40/166* (2020.01); *G06F 40/30* (2020.01); *G06N 20/00* (2019.01)

(58) Field of Classification Search
CPC .................................................. G06F 40/106
See application file for complete search history.

(56) References Cited

U.S. PATENT DOCUMENTS

| | | |
|---|---|---|
| 2014/0052680 A1 | 2/2014 | Nitz et al. |
| 2018/0174281 A1* | 6/2018 | Smith ..................... G06T 5/008 |
| 2020/0004804 A1* | 1/2020 | Srinivasan et al. ... G06F 17/212 |
| 2020/0097340 A1 | 3/2020 | Balik et al. |
| 2020/0167523 A1 | 5/2020 | De Mello Brandao et al. |
| 2022/0171750 A1* | 6/2022 | Guzik et al. .......... G06F 16/219 |

OTHER PUBLICATIONS

"International Search Report and Written Opinion Issued in PCT Application No. PCT/US22/022702", dated Jul. 2022, 10 Pages.

* cited by examiner

*Primary Examiner* — James J Debrow
(74) *Attorney, Agent, or Firm* — NovoTechIP International PLLC

(57) ABSTRACT

For generating visual enhancement suggestions for source content, a system performs storing, in a data storage, a plurality of context data sets, each context data set including a set of visual enhancements and a context for selecting the set of visual enhancements; receiving the source content including source content data and source attribute data; providing, to an artificial intelligence (AI) engine, the received source content, the AI engine configured to select, based on the source content and the context data sets, a first set of visual enhancements and apply the selected first set of visual enhancements to the source content to generate a first visual enhancement suggestion for the source content; extracting, from the AI engine, the first visual enhancement suggestion; and causing the first visual enhancement suggestion to be displayed via a display of a user device.

20 Claims, 10 Drawing Sheets

CONTEXT BASED VISUAL ENHANCEMENT SUGGESTION

BACKGROUND

A large amount of visual content (e.g., documents, presentations, postcards, calendars, menus, templates, notifications, web pages, blog postings, advertisements, public relations (PR)/promotion materials, etc.) is produced every day. Such visual content is typically created using computing devices (e.g., desktops, laptops, workstations, mobile phones, tablets, etc.) running content creation tools (e.g., word processing software, presentation software, web development software, blog software, graphic design software, content development software, etc.). It is well known that visual/aesthetic improvements (e.g., enhanced layouts, color schemes, animation, motion effects, etc.) contribute to more successfully conveying information or ideas or producing a desired effect. To allow users to create more visually improved content, software developers have developed and added various visual enhancement functions to the content creation tools. However, for many users, it is difficult and time consuming to know about available visual enhancement functions and learn how to use the available visual enhancement functions. Hence, most users opt to use limited functions that they are familiar with or not use any visual enhancement at all. As such, there still remain significant areas for new and improved approaches for allowing users to visually enhance content they created without learning or familiarizing numerous and complicated visual enhancement functions available on content creation tools.

SUMMARY

In an implementation, a system for generating visual enhancement suggestions for source content includes a processor and a computer-readable medium in communication with the processor. The computer-readable medium includes instructions that, when executed by the processor, cause the processor to control the system to perform storing, in a data storage, a plurality of context data sets, each context data set including a set of visual enhancements and a context for selecting the set of visual enhancements, the plurality of context data sets including a first context data set which includes a first set of visual enhancements and a first context for selecting the first set of visual enhancements; receiving the source content including source content data and source attribute data; providing, to an artificial intelligence (AI) engine, the received source content, the AI engine configured to select, based on the source content and the plurality of context data sets, the first set of visual enhancements and apply the selected first set of visual enhancements to the source content to generate a first visual enhancement suggestion for the source content; extracting, from the AI engine, the first visual enhancement suggestion; and causing the first visual enhancement suggestion to be displayed via a display of a user device.

In another implementation, a non-transitory computer-readable medium includes instructions that, when executed by a processor, cause the processor to control a system to perform storing, in a data storage, a plurality of context data sets, each context data set including a set of visual enhancements and a context for selecting the set of visual enhancements, the plurality of context data sets including a first context data set which includes a first set of visual enhancements and a first context for selecting the first set of visual enhancements; receiving source content including source content data and source attribute data; providing, to an artificial intelligence (AI) engine, the received source content, the AI engine configured to select, based on the source content and the plurality of context data sets, the first set of visual enhancements and apply the selected first set of visual enhancements to the source content to generate a first visual enhancement suggestion for the source content; extracting, from the AI engine, the first visual enhancement suggestion; and causing the first visual enhancement suggestion to be displayed via a display of a user device.

In another implementation, a method of operating a system for generating visual enhancement suggestions for source content includes storing, in a data storage, a plurality of context data sets, each context data set including a set of visual enhancements and a context for selecting the set of visual enhancements, the plurality of context data sets including a first context data set which includes a first set of visual enhancements and a first context for selecting the first set of visual enhancements; receiving the source content including source content data and source attribute data; providing, to an artificial intelligence (AI) engine, the received source content, the AI engine configured to select, based on the source content and the plurality of context data sets, the first set of visual enhancements and apply the selected first set of visual enhancements to the source content to generate a first visual enhancement suggestion for the source content; extracting, from the AI engine, the first visual enhancement suggestion; and causing the first visual enhancement suggestion to be displayed via a display of a user device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to generating visual enhancement suggestions for source content created by a user. A machine learning (ML) engine is trained with previous visual enhancement activity data to identify a plurality of contexts, each used for selecting a particular set of visual enhancements. The contexts are then used by an artificial intelligence (AI) engine to select a set of visual enhancements for the source content. Hence, users do not need to know or learn which visual enhancement functions are available, how each visual enhancement visually transforms the original content, how to select and control visual enhancement functions, how to combine different visual enhancements, how to sequence rendering of different visual enhancement, etc. By having the AI engine analyze original content and context and select an appropriate visual enhancement set, users can easily and quickly visually enhance the source content even if they are not familiar with any visual enhancement functions available from content creation tools.

Currently, there are no tools or services providing comprehensive and sophisticated visual enhancements relevant to a context of source content. Also, a visual/aesthetic quality of source content is severely limited by each user's familiarity with numerous and complicated visual enhancement functions available from contention creation tools. By having the AI engine select a set of visual enhancements associated with a particular context of source content, it becomes possible to provide a comprehensive and sophisticated visual enhancement suggestion that is highly relevant to the context of the source content. Therefore, this disclosure provides a technical solution to the technical problem that currently there are no tools or services providing contextually relevant visual enhancements for source content. The disclosure also allows users to visually enhance source content without needing to familiarize with various visual enhancement functions.

Figure 1:
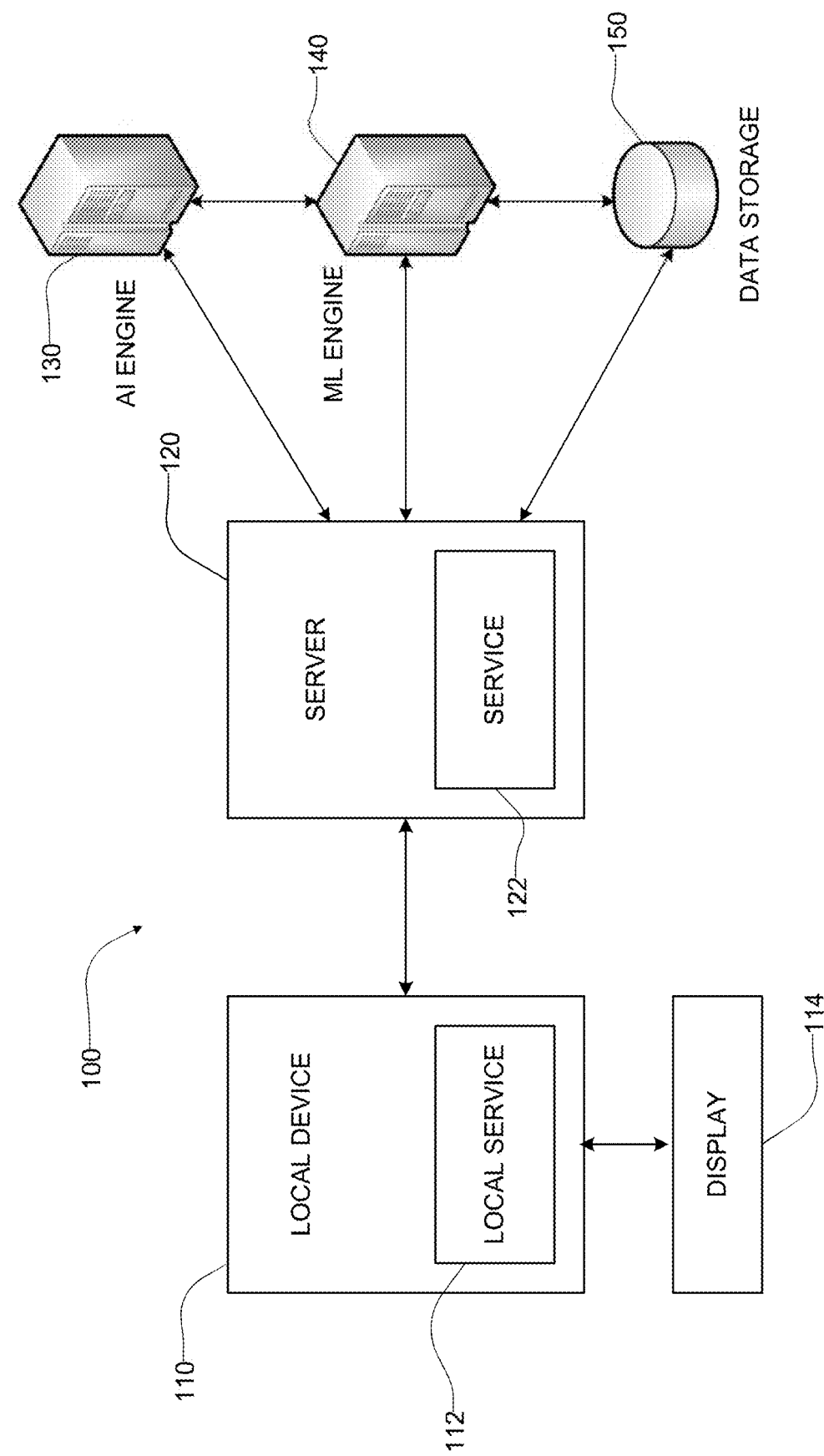
FIG. 1 illustrates an example system for providing visual enhancement suggestions for source content data, in accord with the disclosure herein.

With this overview, attention is now turned to the figures which describe various implementations of the presenting teachings. FIG. 1 illustrates a system 100 configured to generate one or more visual enhancement suggestions for source content created by a user. The system 100 may include a local device 110, a server 120, an artificial intelligent (AI) engine 130, a machine learning (ML) engine 140, a data storage 150, and/or the like.

The local device 110 is representative of any physical or virtual computing system, device, or collection thereof, such as a smart phone, laptop computer, desktop computer, hybrid computer, tablet computer, gaming machine, smart television, entertainment device, Internet appliance, virtual machine, wearable computer, as well as any variation or combination thereof. The local device 110 may operate remotely from the server 120, and hence may communicate with each other by way of data and information exchanged over a suitable communication link or links. The local device 110 may implement all or portions of the functions to provide visual enhancement suggestions for content created by a user of the local device 110. The local device 110 may also be in communication with the AI engine 130, ML engine 140, data storage 150 via the server 120.

The local device 110 may host a local service 112 configured to provide visual enhancement suggestions. The local service 112 is representative of any software application, module, component, or collection thereof, capable of providing visual enhancement suggestions. The local service 112 may operate independently from or as part of a software tool (e.g., word processing software, presentation software, web development software, blog software, graphic design software, content creation software, etc.) for creating content (e.g., documents, presentations, postcards, calendars, menus, templates, notifications, web pages, blog postings, advertisements, public relations (PR)/promotion materials, etc.). The local device 110 may include or be connected to a display 114, which may display a graphical user interface (GUI) for the local service 112 or the software tool.

In an implementation, the local service 112 may be implemented as a locally installed and executed application, streamed application, mobile application, or any combination or variation thereof, which may be configured to carry out operations or functions related to providing visual enhancement suggestions. Alternatively, the local service 112 may be implemented as part of an operating system (OS), such as Microsoft™ Windows™, Apple™ iOS™, Linux™, Google™ Chrome OS™, etc. The local service 112 may be implemented as a standalone application or may be distributed across multiple applications.

The server 120 is representative of any physical or virtual computing system, device, or collection thereof, such as, a web server, rack server, blade server, virtual machine server, or tower server, as well as any other type of computing system, which may be, in some scenarios, implemented in a data center, a virtual data center, or some other suitable facility. The server 120 may operate a visual enhancement suggestion service 122, which may implement all or portions of the functions to generate visual enhancement suggestions. The service 122 may host, be integrated with, or be in communication with various data sources and processing resources such as, AI engine 130, ML engine 140, data storage 150, etc. The service 122 may be any software application, module, component, or collection thereof capable of the visual enhancement suggestion service to the local service 112. In some cases, the service 122 is a standalone application carrying out various operations related to providing visual enhancement suggestions.

The features and functionality provided by the local service 112 and service 122 may be co-located or even integrated as a single application. In addition to the above-mentioned features and functionality available across application and service platforms, aspects of the visual enhancement suggestion service may be carried out across multiple devices on a same or different computing devices. For example, some functionality for the visual enhancement suggestion service may be provided by the local service 112 on the local device 10 and the local service 112 may communicate by way of data and information exchanged between with the server 120 or other devices. As another example, the local device 110 may operate as a so-called "thin client" in a virtual computing environment and receive video data that is to be displayed via the display 114. In this virtual computing scenario, the server 120 may carry out the entire operations of providing visual enhancement suggestions.

For providing more accurate and relevant visual enhancement suggestions, various information from various resources may be searched and considered, such as the AI engine 130, ML engine 140, data storage 150, etc. The AI and ML engines 140 and 150 may be implemented based on a machine-learning (ML), which generally involves various algorithms that can automatically learn over time. The foundation of these algorithms is generally built on mathematics and statistics that can be employed to predict events, classify entities, diagnose problems, and model function approximations. As an example, the ML engine 140 may be trained in order to identify patterns in prior visual enhancement activities by the user of the local device 110 or other users, determine associations between various datapoints and make decisions based on the patterns and associations. Such determination may be made following the accumulation, review, and/or analysis of data from a large number of users over time, that may be configured to provide the ML algorithm (MLA) with an initial or ongoing training set.

In different implementations, a training system may be used that includes an initial ML model (which may be referred to as an "ML model trainer") configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer may be configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced. The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Figure 2:
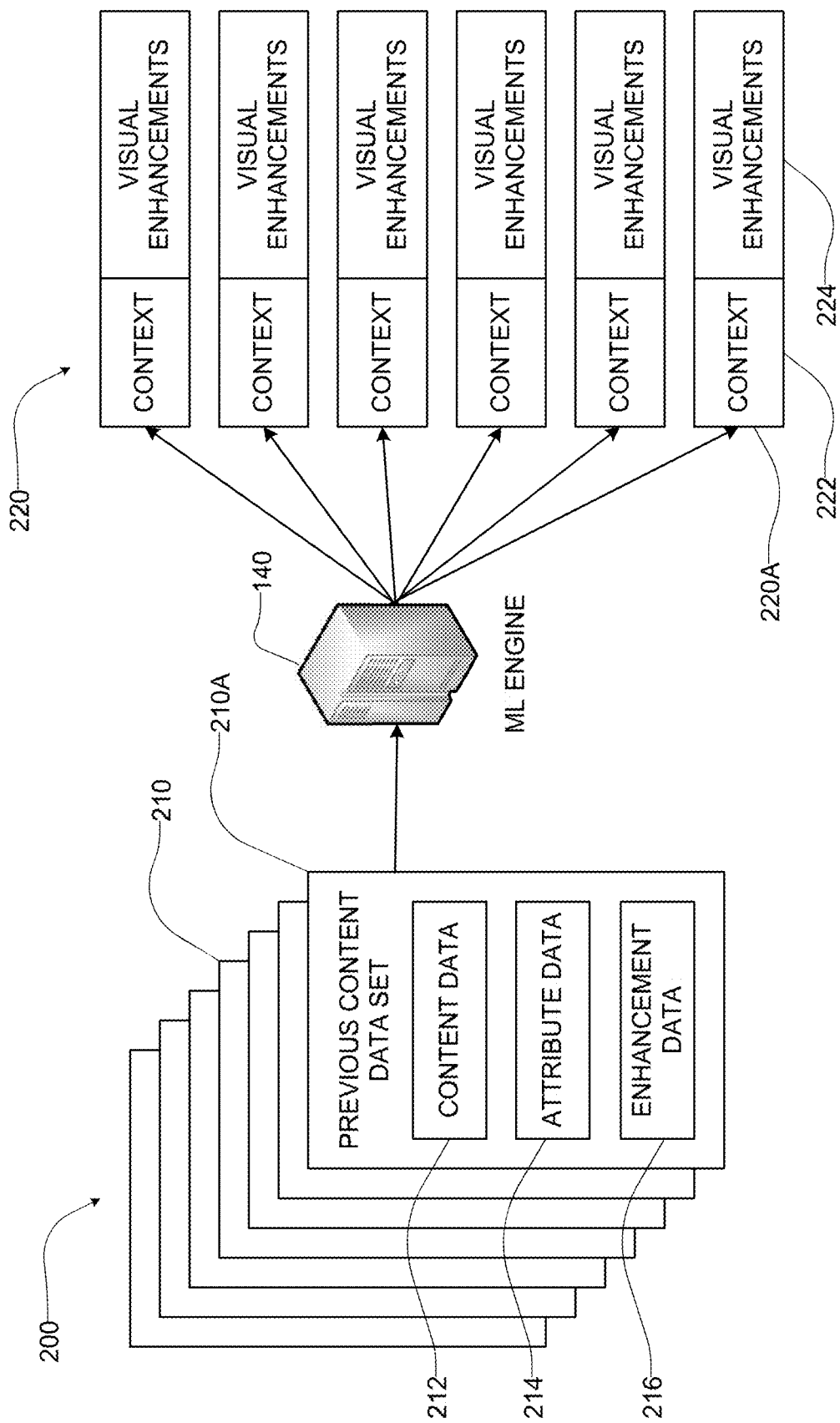
FIG. 2 illustrates an example machine learning (ML) engine being trained with previous enhancement activity data to identify a plurality of context data sets.

FIG. 2 illustrates an example of the ML engine 140 being trained with previous enhancement activity data 200 to identify patterns or contextual relationships within the previous enhancement activity data 200. The previous enhancement activity data 200 may include a number of content data sets 210 (e.g., document files, presentation files, webpage design files, visual content files, etc.), which may have been previously enhanced manually by the user of the local device 110, users of other local devices, etc., or automatically by the system 100 or other visual enhancement tools. Each previous content data set, 210 for example, a data set 210A, may include content data 212 (e.g., a text, image, video, etc.), attribute data 214 (e.g., user information, content information, location information, language information, etc.), enhancement data 216 (e.g., a set of visual enhancements applied to the content data 212), etc. Each visual enhancement may include at least one of adding a template, document structure or color scheme, adding one or more visual elements, animations or motion effects, sequencing rendering of the animations or motion effects, changing a font type or font size, changing a shape, size, color or location of an existing visual element, etc.

Some of the previous content data sets 210 may be sample content data sets created by professional visual content creators who are familiar with all the visual enhancement functions available from various content creation tools. The previous content data set 200 may include sample visual content that has not been visually enhanced but may be used as references or guidance on selecting visual enhancement for specific contexts.

From the previous enhancement activity data 200, the ML engine 140 may identify patterns or contextual relationships among the content data 212, attribute data 216 and enhancement data 216. For example, the content data set 210A may be a presentation file (e.g., Microsoft™ PowerPoint™) created by an elementary school teacher for a science class. The teacher may have years of experiences in creating class presentation materials and may have used various advanced features including animations, motion effects, etc. to visually enhance text-based content of the content data set 210A. Based on the content data 212 (e.g., science class-related text), attribute data 214 (e.g., user's occupation (e.g., elementary school teacher), content type (e.g., presentation), audience (e.g., elementary school students), subject (e.g., science), etc.), enhancement data 216 (e.g., design, layout, color scheme, template, background, font type and size, animations, motion effects, etc.) of the content data set 210A, the system 100 may identify context (e.g., elementary school, science, etc.) associated with the visual enhancements applied to the particular content data 212 of the content data set 210A. Such identification of a context associated with a particular set of visual enhancements may be performed on numerous previous content data sets 210, which may allow the ML engine 140 to learn patterns or contextual relationships among the content data 212, attribute data 214 and enhancement data 216 of the previous content data sets 210.

Based on the learning process, the ML engine 140 may generate a plurality of context data sets 220 by associating a set of visual enhancements with a particular context. For example, the context data sets 220 may include a context data set 220A which may include a context 222 and a set of visual enhancements 224 associated with the context 222. The context 222 may include a content type (e.g., presentation), audience (e.g., elementary school students), subject (e.g., science class), etc. The visual enhancement set 224 may include a template, design, layout, color scheme, motion effects, motion effects rendering sequence, and/or the like, which the ML engine 140 have identified as being suitable for the particular context 222. For example, the visual enhancement set 224 may include a simple and colorful template, background and color scheme and aesthetically child-friendly font type, motion effects and rendering sequence may be selected for the particular context 222. Each context data set 220 may include a different context and a different visual enhancement set. For example, for the context of a business presentation in English language for Chinese participants in China, the visual enhancement set may include a red-themed template and color scheme, more professional template and design, Chinese-friendly background image (e.g., dragon, Chinese flag, etc.) and font type, etc.

Figure 3:
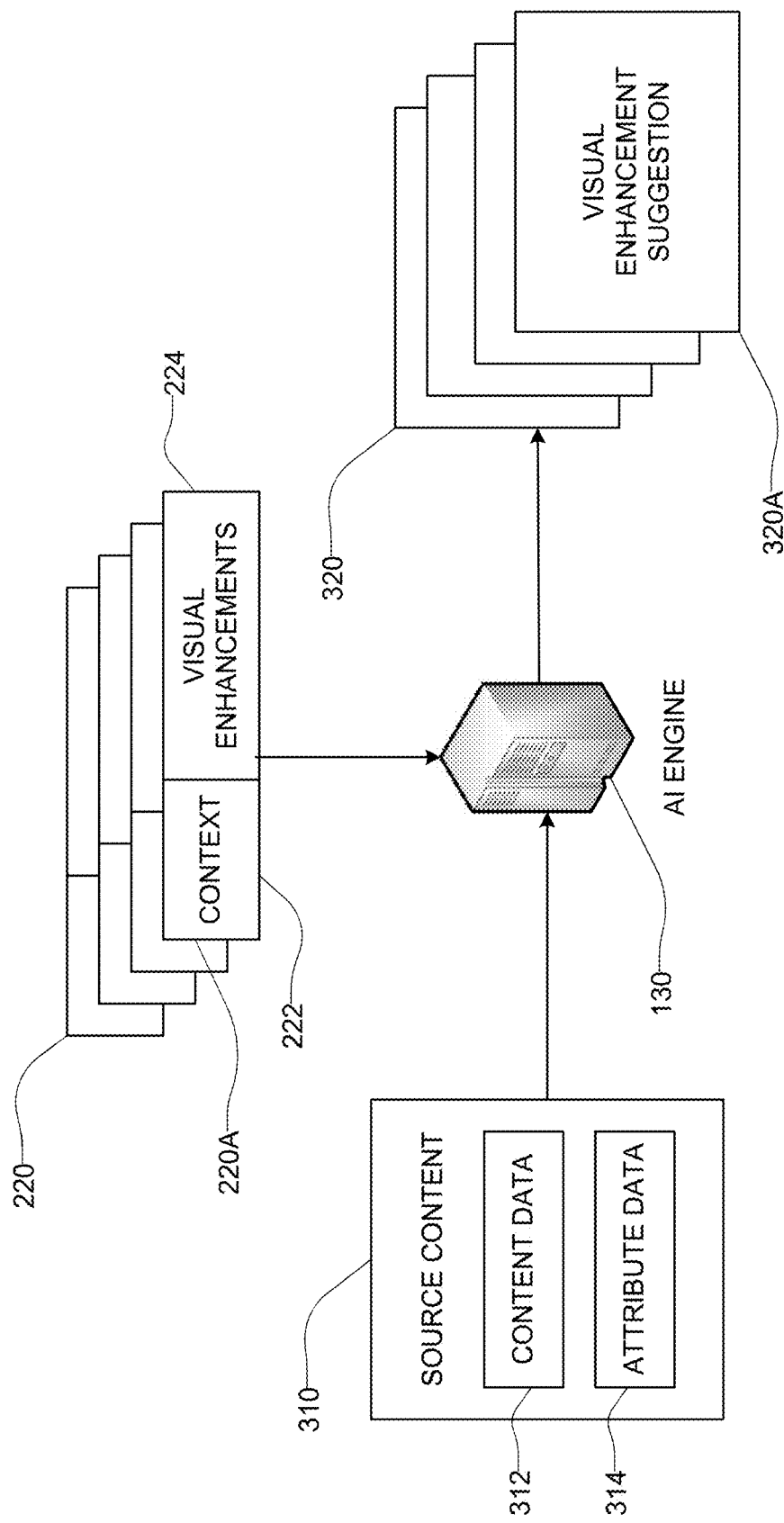
FIG. 3 illustrates an example artificial intelligent (AI) engine generating, based on the context data sets, one or more visual enhancement suggestions for the source context data.

The context data sets 220 may then be stored in the data storage 150 and shared with the AI engine 130 such that the system 100 can generate one or more visual enhancement suggestions for source content created by the user of the local device 110. FIG. 3 illustrates an example of the AI engine 130 receiving source content 310 and generating, based on one or more context data sets 220 relevant to the source content 310, a set of visual enhancement suggestions 320 for the source content 310. The source content 310 may include source content data 312 (e.g., text, image, video, etc.) and source attribute data 314. The source attribute data 314 may include user information (e.g., username, user ID, occupation, organization, location, preferred language, etc.), content information (e.g., content type, audience, subject, occasion, etc.), location information (e.g., China, France, etc.), language information (e.g., English, Chinese, etc.), and/or the like.

Based on the received source content 310, the AI engine 130 may search the context data sets 220 stored in the data storage 150 to select one or more context data sets 220 that are relevant to the received source content 310. Each selected context data set 220 may include a set of visual enhancements 224 and the context 222 associated with the visual enhancement set 224. For example, the source content 310 may be a technical paper for submission to a technical professional organization and may include a title, headings, subheadings, paragraphs, images, charts, citations, etc. The source content data 312 of the source content 310 may include text, document structure, images, graphics, etc. The source attribute data 314 of the source content 310 may include user information (e.g., username, user ID, user title, user organization, etc.), the content type (e.g., technical paper), the content purposes (e.g., submission to the particular technical organization), etc. Based on the source content data 312 and source attribute data 314, the AI engine 130 may communicate with the ML engine 140 or search the data storage 150 to identify one or more context data sets 220 that are contextually relevant to the source content 310. For example, the AI engine 130 may search for one or more context data sets 220, of which the context 222 includes the same or similar content type (e.g., technical paper), content context (e.g., a title, summary, abstract, etc.), user occupation (e.g., a researcher, engineer, professor, graduate school student, etc.), organization (e.g., a university, research center, company, etc.), content objectives (e.g., submission to a technical organization, etc.), and/or the like. Each context 222 may be associated with a different set of visual enhancements 224. For example, the visual enhancement set 224 of a context data set 220A may include a document design (e.g., paper size, heading and subheading size and location, paragraph numbering, etc.), text layout (e.g., two columns), color scheme (e.g., black and white), font type and size, image size and location, citation format, footnote format and location, etc., which is associated with the corresponding context 222.

Upon identifying the relevant context data sets 220, the AI engine 130 may create one or more visual enhancement suggestions 320 for the source content 310. Each visual enhancement suggestion 320 may include the source content data 312 applied with the visual enhancement set 224 of the relevant context data set 220. For example, the AI engine 130 may generate a visual enhancement suggestion 320A by applying the visual enhancement set 224 of the context data set 220A to the source content data 312 of the source content 310. Each visual enhancement may include at least one of adding a template, document structure or color scheme, adding one or more visual elements, animations or motion effects, sequencing rendering of the animations or motion effects, changing a font type or font size, changing a shape, size, color or location of an existing visual element, etc.

As such, the AI engine 130 may transform the source content data 312 of the source content 310 to a visually enhanced content suggestion, which includes the optimized document design, text layout, color scheme, font type and size, image size and location, citation format, footnote format and location, etc. The system 100 may then cause the one or more visual enhancement suggestions 320 to be displayed via the GUI of the local device 110. The user may then review and select one of the suggestions 320. In turn, the system 100 may generate visually enhanced content based on the selected visual enhancement suggestion 320 and send the visually enhanced content to the local device 110 or store the visually enhanced content in the data storage 150, cloud storage, etc.

Accordingly, the system 100 can generate a number of visual enhancement suggestions 320 for the source content 310. By selecting one of the suggestions 320, the user is provided with visually enhanced content. Hence, the user may not need to do anything to visually enhance the source content 310. Also, the user does not need to know or learn which visual enhancement functions are available and how to use available visual enhancement functions. Therefore, this disclosure allows users to visually enhance source content without needing to familiarize with various visual enhancement functions. Also, the disclosure provides a technical solution to the technical problem that currently there are no tools or services providing contextually relevant visual enhancements for source content.

Figure 4:
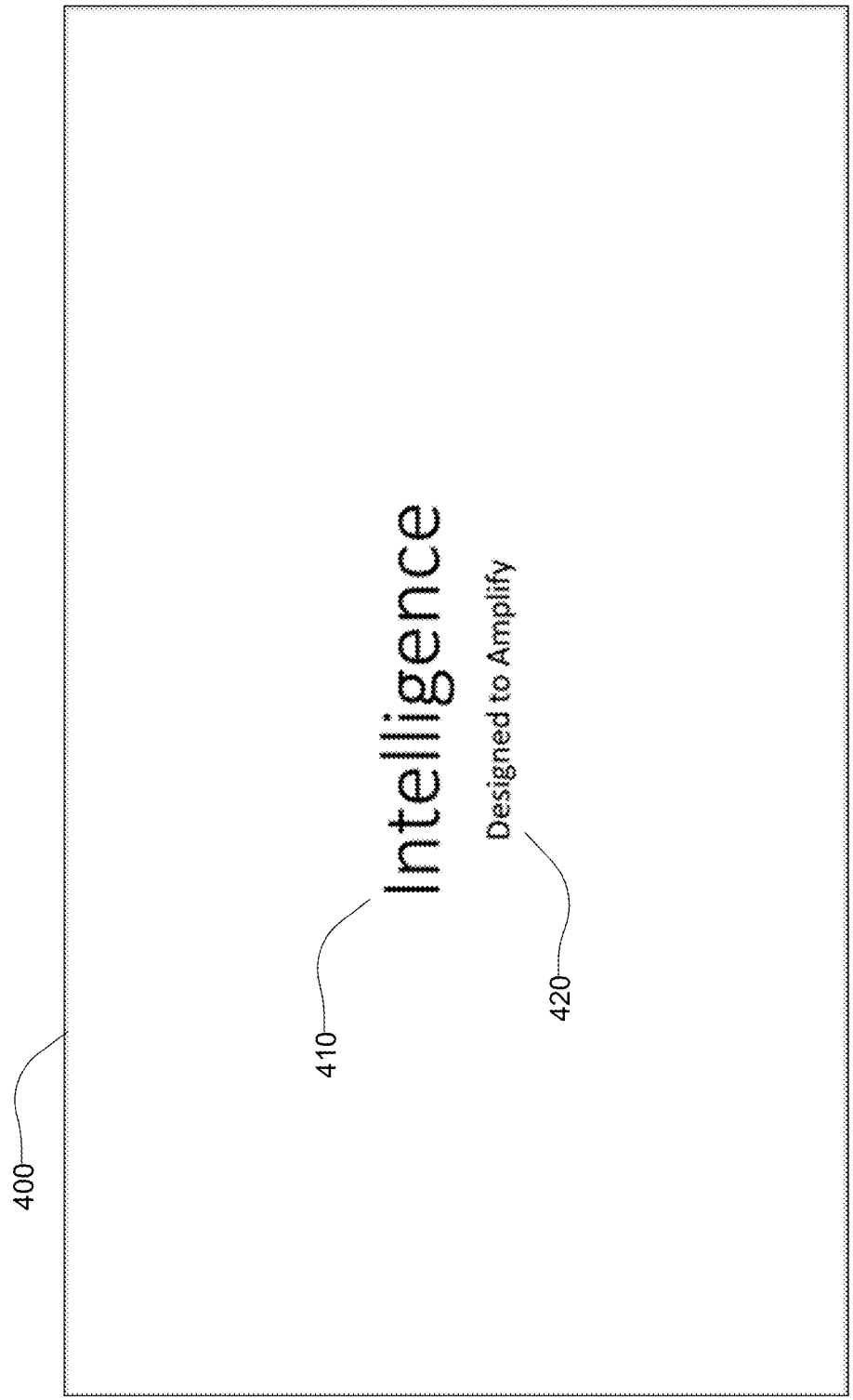
FIG. 4 illustrates example source content created by a user.

FIG. 4 illustrates example source content 400 created by the user using the local device 110 running a piece of presentation software. The source content 400 may be a simple presentation slide including a large visual element 410 including a text "Intelligence" and a smaller visual element 420 including a text "Designed to Amplify." The user may find it necessary to visually enhance the presentation slide 400 but may have limited or no knowledge on how to use visual enhancement functions available from the presentation software. The local service 112 may be configured to display, via the GUI, an option allowing the user to request the system 100 to make visual enhancement suggestions for the presentation slide 400. Alternatively, when the system 100 determines that there is enough information for generating visual enhancement suggestions 320 for the slide 400, the local service 112 may automatically generate and display, via the GUI, a notification or message suggesting having the system 100 generate visual enhancement suggestions for the slide 400.

When a user input selecting the option or responding to the notification or message is received, the system 100 may perform the visual enhancement service. For example, the system 100 may analyze the content and attribute of the slide 400 and identify that the larger visual element 410 and smaller visual element 420 are located at the center of the slide 400. Based on the analysis, the system 100 may determine that the slide 400 is a first slide of a presentation file (e.g., Microsoft™ PowerPoint™ file, etc.). The system 100 may also determine, based on the texts "Intelligence" and "Designed to Amplify," that the slide 400 is for a public speech to be used in a professional event. The attribute of the slide 400 may indicate that the author is a vice president of an AI engineering company. Based on such content and attribute of the slide 400, the AI engine 130 may search the data storage 150 or communicate with the ML engine 140 to identify one or more relevant context data sets 220 including a visual enhancement set associated with the context 222 relevant to the slide 400.

Figure 5A:
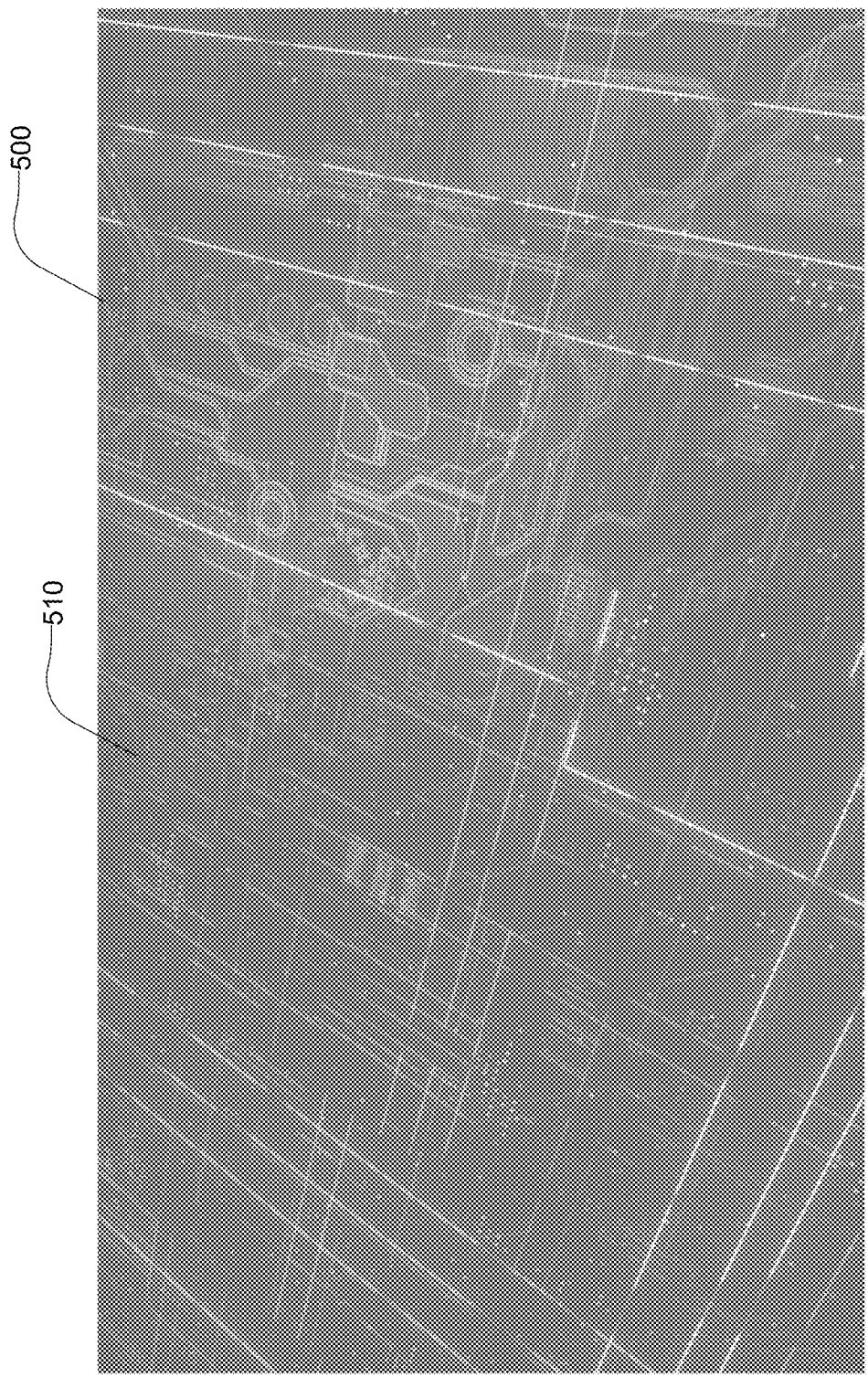
FIGS. 5A, 5B and 5C illustrate images of an example visual enhancement suggestion at different times.
Figure 5B:
Figure 5C:
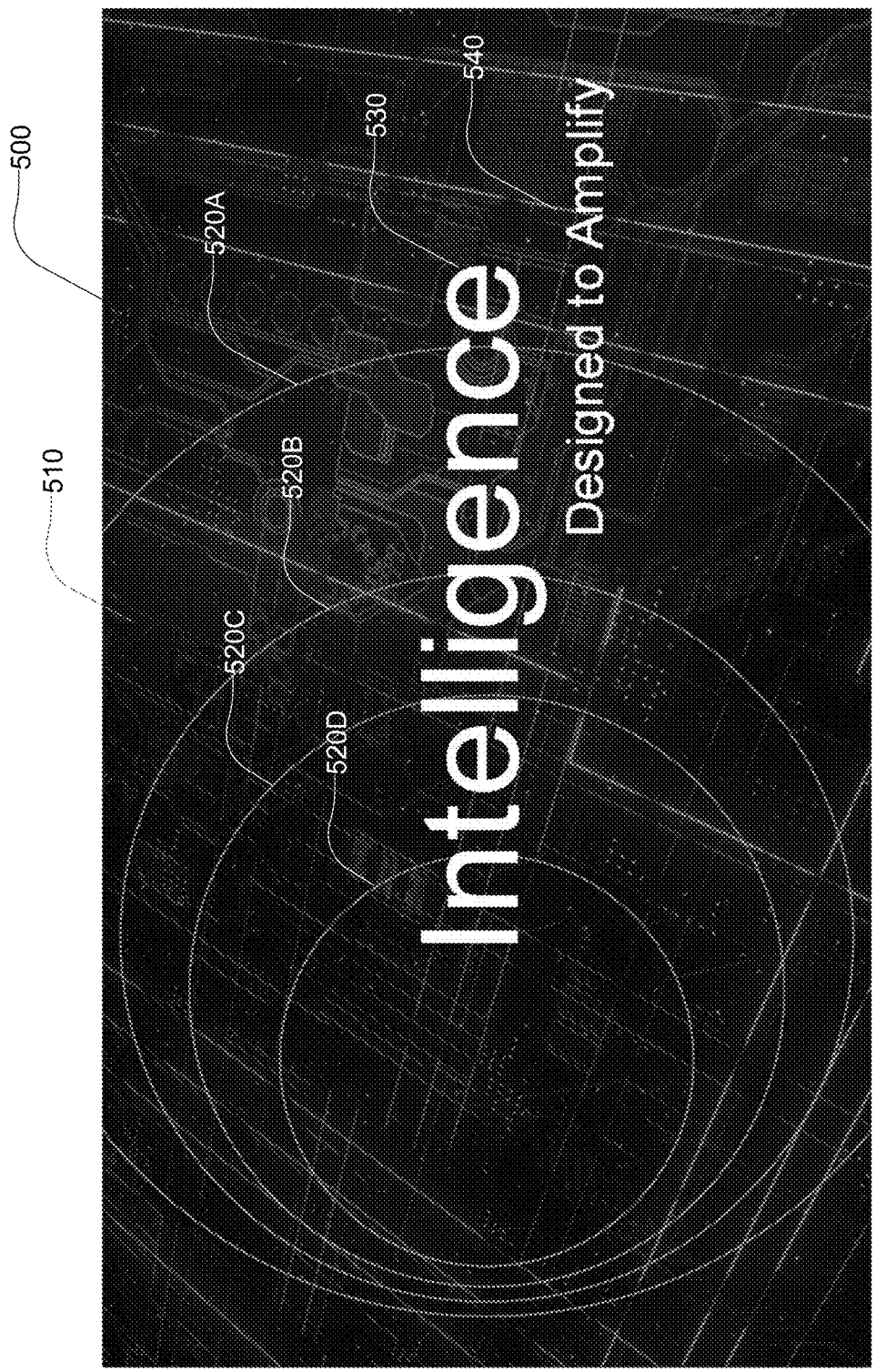

FIGS. 5A, 5B and 5C show visual images of a visual enhancement suggestion 500 selected for the source content 400 at different times. The suggestion 500 may include various visual enhancements, for example, a background image, color scheme, motion effects, different front types and sizes, different visual element relocations, motion effect rendering sequences, etc. For example, as shown in FIG. 5A, a dark colored high-tech computer circuitry-themed image 510 may be selected as the background for the suggestion 500. Initially, the selected image 510 may appear in a faded color. Then, as shown in FIGS. 5B and 5C, the image 510 may become gradually darker, more vivid and clear. In addition, a new visual element 520A (e.g., circle) may appear on the left side of the suggestion 500, as shown in FIG. 5B, and then become gradually bigger while new circles 520B, 520C, 520D sequentially appear and become gradually bigger in a non-concentric manner as shown in FIG. 5C. The text-based visual elements 420 and 430 may be transformed to new visual elements 530 and 540, respectively. The visual elements 530 and 540 may have different font sizes, color (e.g., white) and locations from those of the visual elements 410 and 420 of the source slide 400. The visual elements 530 and 540 may be choreographed to slide down and up from the top and bottom of the suggestion 500, respectively and to move at different speeds. The visual elements 530 and 540 may be timed to appear after a certain period of time has passed or in synchronization with motion effects associated with other visual elements. For example, the visual elements 530 and 540 may be timed to appear in synchronization with the initial appearing of the circles 520C and 520D, respectively. As such, the suggestion 500 generate by the AI engine 130 may provide a sophisticated and professional slide implemented with additional visual elements and motion effects, of which the rendering is sequenced and choreographed to improve or maximize visual impact.

Figure 6A:
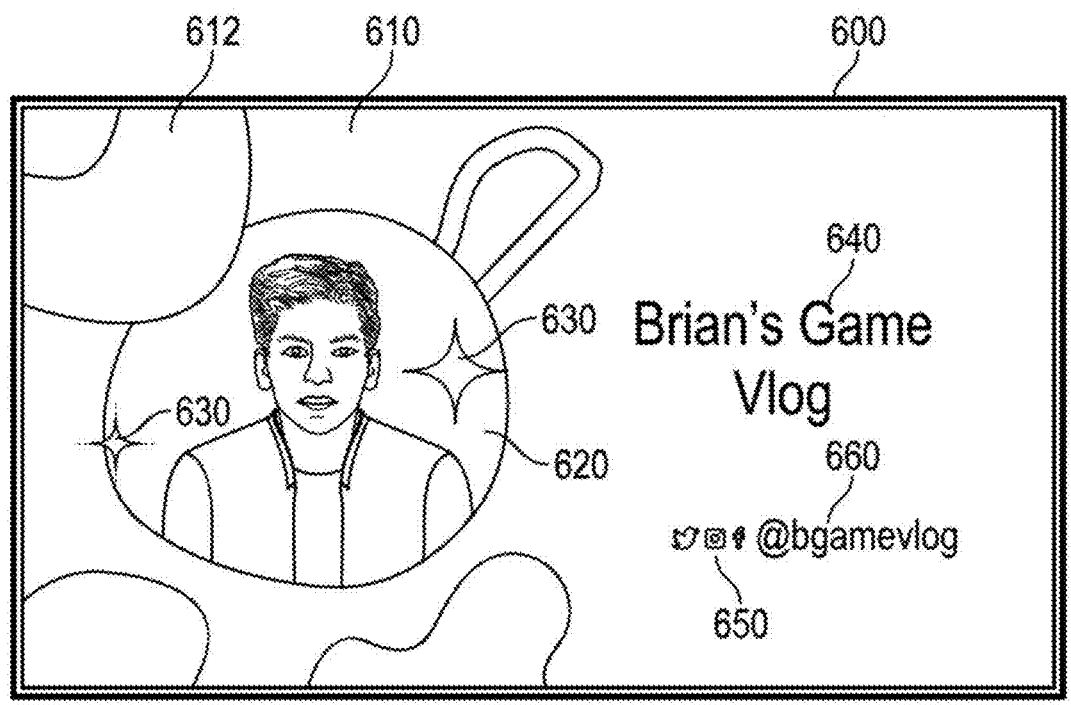
FIGS. 6A and 6B illustrate images of another example visual enhancement suggestion at different times.
Figure 6B:
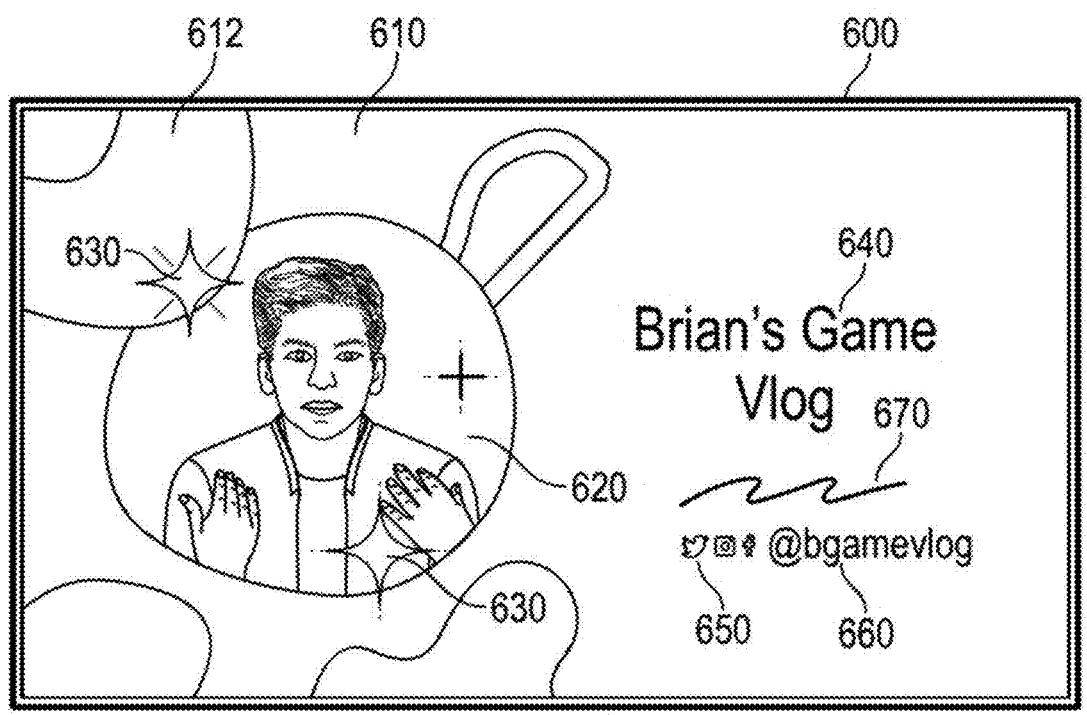

FIGS. 6A and 6B illustrate another example visual content suggestion 600 selected by the AI engine 130 for source content (not shown) including a number of visual elements, such as video content 620, title text "Brian's Game Vlog," three SNS icons 650, and SNS ID text "@bgamevlog" 660. Based on the content and attribute of the source content, the system 100 may determine that the source content is created by a child named "Brian" to promote his SNS accounts related to video games. The AI engine 130 may then identify one or more visual enhancement suggestions contextually relevant to the source content. Each suggestion, for example, the suggestion 600, may include a set of visual enhancements that are simple, cute and colorful. For example, the suggestion 600 may include a green background 610 with a number of round-shaped objects 612 having a lighter color (e.g., yellow). The video content 620 from the source content may be cropped to have a round shape and be positioned on the left side of the suggestion 600. Sparkling motion effects 630 may appear and disappear at various locations on or around the video content 620. A white title visual element 640 may be created using a large font and positioned on the right side of the suggestion 600, and the SNS icons 650 and SNS ID text 660 in white may be positioned below the title visual element 640. In FIG. 6B, after a certain period of time has passed (e.g., 3 seconds), a wave-shaped visual element 670 may appear immediately below the title visual element 640 to provide a decorative effect. As such, even though the content creator is a child who is yet to learn how to use various visual enhancement functions, the system 100 may help the child instantly transform the source content to a visually enhanced and aesthetically pleasing visual content by selecting a visual enhancement suggestion generated by the AI engine 130.

Figure 7:
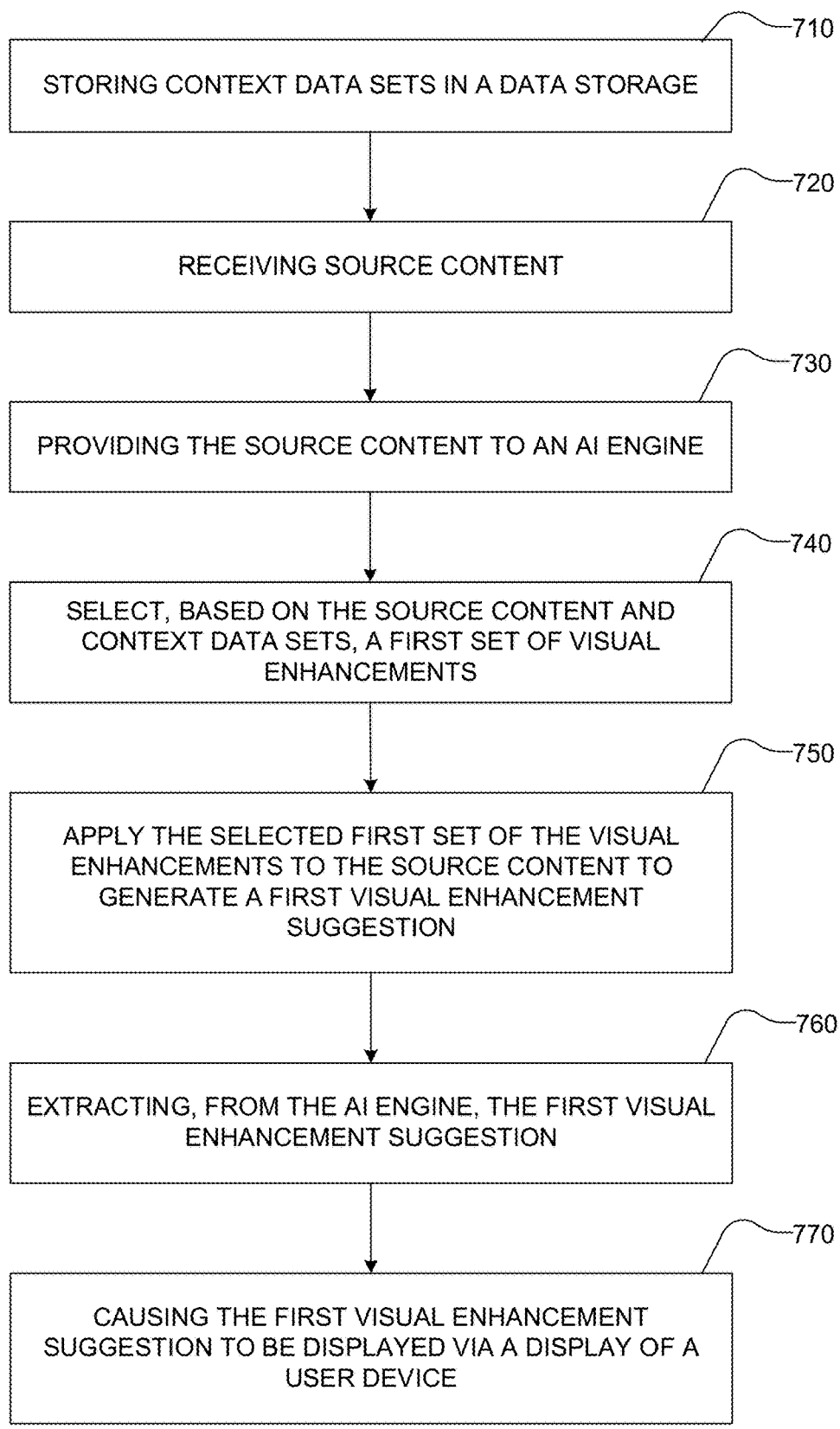
FIG. 7 illustrates a flow diagram showing example operations by the system to generate one or more visual enhancement suggestions.

FIG. 7 illustrates a flow diagram showing example operations by the system 100 to generate one or more visual enhancement suggestions for source content created by the user of the local device 110.

At step 710, the system 100 may store, in the data storage 150, a plurality of context data sets 220. Each context data set 220 may include a set of visual enhancements 224 and a context 222 for selecting the set of visual enhancements 224. The plurality of context data sets 220 may include a first context data set 220A which includes a first set of visual enhancements and a first context for selecting the first set of visual enhancements.

At step 720, the system 100 may receive the source content 310 including source content data 312 and source attribute data 314. The source content data 312 may include one or more visual elements, and each visual element may include a text, image or video. The source attribute data 314 may include at least one of user information, content information, location information and language information of the source content.

At step 730, the system 100 may provide, to the artificial intelligence (AI) engine 130, the received source content. At step 740, the AI engine 130 may select, based on the source content 310 and the plurality of context data sets 220, the first set of visual enhancements 224. Then, at step 750, the AI engine 130 may apply the selected first set of visual enhancements 224 to the source content 310 to generate a first visual enhancement suggestion 320A for the source content 310. Each visual enhancement may include at least one of adding a template, document structure or color scheme, adding one or more visual elements, animations or motion effects, sequencing rendering of the animations or motion effects, changing a font type or font size, changing a shape, size, color or location of an existing visual element, etc.

At 760, the first visual enhancement suggestion 320A may be extracted from the AI engine 130, and the system 100 may cause the first visual enhancement suggestion 320A to be displayed via the display 114 of the local device 110. Accordingly, the system 100 may generate suitable visual enhancement suggestions for the source content 310 created by the user. This may allow the user to create sophisticated, professional visual content easily and promptly without needing to know or learn how to use various visual enhancement functions available from software tools. Therefore, this disclosure allows users to visually enhance source content without needing to familiarize with various visual enhancement functions. Also, the disclosure provides a technical solution to the technical problem that currently there are no tools or services providing contextually relevant visual enhancements for source content.

Figure 8:
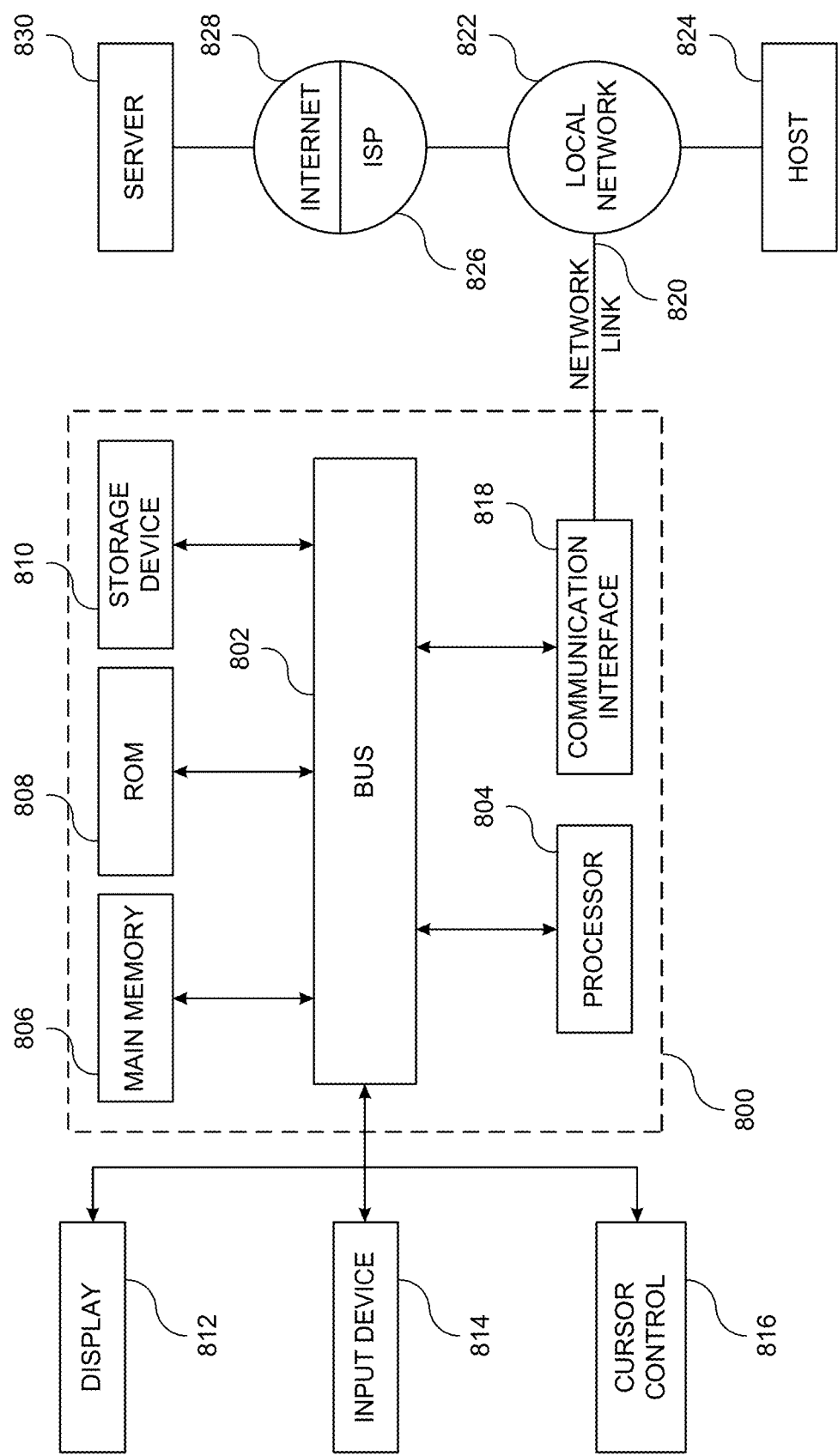
FIG. 8 is a block diagram showing an example computer system upon which aspects of this disclosure may be implemented.

FIG. 8 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, the local device 110, server 120, AI engine 130 and ML engine 140.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

In the following, further features, characteristics and advantages of the invention will be described by means of items:

Item 1. A system for generating visual enhancement suggestions for source content, the system comprising a processor and a computer-readable medium in communication with the processor, the computer-readable medium comprising instructions that, when executed by the processor, cause the processor to control the system to perform storing, in a data storage, a plurality of context data sets, each context data set comprising a set of visual enhancements and a context for selecting the set of visual enhancements, the plurality of context data sets comprising a first context data set which includes a first set of visual enhancements and a first context for selecting the first set of visual enhancements; receiving the source content including source content data and source attribute data; providing, to an artificial intelligence (AI) engine, the received source content, the AI engine configured to select, based on the source content and the plurality of context data sets, the first set of visual enhancements and apply the selected first set of visual enhancements to the source content to generate a first visual enhancement suggestion for the source content; extracting, from the AI engine, the first visual enhancement suggestion; and causing the first visual enhancement suggestion to be displayed via a display of a user device.

Item 2. The system of Item 1, wherein the instructions, when executed by the processor, further cause the processor to control the system to perform training, based on previous enhancement activity data, a machine learning (ML) engine to generate the plurality of context data sets.

Item 3. The system of Item 2, wherein the previous enhancement activity data comprises a plurality of content data sets that have been previously visually enhanced, each content data set comprising content data, attribute data and one or more of the visual enhancements applied to the content data.

Item 4. The system of Item 3, wherein, for training the ML engine, the instructions, when executed by the processor, further cause the processor to control the system to perform providing, to the ML engine, the previous enhancement activity data, wherein the ML engine is configured to identify, from the plurality of content data sets, a plurality of contextual relationships between the content and attribute data and the one or more visual enhancements applied to the content data and generate, based on the identified contextual relationships, the plurality of context data sets, each context data set comprising a set of visual enhancements and a context for selecting the set of visual enhancements; and extracting, from the ML engine, the plurality of context data sets.

Item 5. The system of Item 3, wherein the source attribute data comprises at least one of user information, content information, location information and language information.

Item 6. The system of Item 3, wherein the source content data comprises one or more visual elements, each visual element comprising a text, image or video.

Item 7. The system of Item 1, wherein the visual enhancement comprises at least one of adding a template, document structure or color scheme; adding one or more visual elements, animations or motion effects; sequencing rendering of the animations or motion effects; changing a font type or font size; and changing a shape, size, color or location of an existing visual element.

Item 8. The system of Item 1, wherein the instructions, when executed by the processor, further cause the processor to control the system to perform receiving a user input requesting to provide a visual enhancement suggestion for the source content.

Item 9. The system of Item 1, wherein the instructions, when executed by the processor, further cause the processor to control the system to perform causing a message to be displayed via the display of the user device, the message offering to generate the visual enhancement suggestion for the source content.

Item 10. A non-transitory computer-readable medium comprising instructions that, when executed by a processor, cause the processor to control a system to perform storing, in a data storage, a plurality of context data sets, each context data set comprising a set of visual enhancements and a context for selecting the set of visual enhancements, the plurality of context data sets comprising a first context data set which includes a first set of visual enhancements and a first context for selecting the first set of visual enhancements; receiving source content including source content data and source attribute data; providing, to an artificial intelligence (AI) engine, the received source content, the AI engine configured to select, based on the source content and the plurality of context data sets, the first set of visual enhancements and apply the selected first set of visual enhancements to the source content to generate a first visual enhancement suggestion for the source content; extracting, from the AI engine, the first visual enhancement suggestion; and causing the first visual enhancement suggestion to be displayed via a display of a user device.

Item 11. A method of operating a system for generating visual enhancement suggestions for source content, the method comprising storing, in a data storage, a plurality of context data sets, each context data set comprising a set of visual enhancements and a context for selecting the set of visual enhancements, the plurality of context data sets comprising a first context data set which includes a first set of visual enhancements and a first context for selecting the first set of visual enhancements; receiving the source content including source content data and source attribute data; providing, to an artificial intelligence (AI) engine, the received source content, the AI engine configured to select, based on the source content and the plurality of context data sets, the first set of visual enhancements and apply the selected first set of visual enhancements to the source content to generate a first visual enhancement suggestion for the source content; extracting, from the AI engine, the first visual enhancement suggestion; and causing the first visual enhancement suggestion to be displayed via a display of a user device.

Item 12. The method of Item 11, further comprising training, based on previous enhancement activity data, a machine learning (ML) engine to generate the plurality of context data sets.

Item 13. The method of Item 12, wherein the previous enhancement activity data comprises a plurality of content data sets that have been previously visually enhanced, each content data set comprising content data, attribute data and one or more the visual enhancements applied to the content data.

Item 14. The method of Item 13, wherein training the ML engine comprises providing, to the ML engine, the previous enhancement activity data, wherein the ML engine is configured to identify, from the plurality of content data sets, a plurality of contextual relationships between the content and attribute data and the one or more visual enhancements applied to the content data and generate, based on the identified contextual relationships, the plurality of context data sets, each context data set comprising a set of visual enhancements and a context for selecting the set of visual enhancements; and extracting, from the ML engine, the plurality of context data sets.

Item 15. The method of Item 13, wherein the source attribute data comprises at least one of user information, content information, location information and language information.

Item 16. The system of Item 13, wherein the source content data comprises one or more visual elements, each visual element comprising a text, image or video.

Item 17. The method of Item 11, wherein the visual enhancement comprises at least one of adding a template, document structure or color scheme; adding one or more visual elements, animations or motion effects; sequencing rendering of the animations or motion effects; changing a font type or font size; and changing a shape, size, color or location of an existing visual element.

Item 18. The method of Item 11, further comprising receiving a user input requesting to provide a visual enhancement suggestion for the source content.

Item 19. The method of Item 11, further comprising causing a message to be displayed via the display of the user device, the message offering to generate the visual enhancement suggestion for the source content.

Item 20. The method of Item 11, wherein the plurality of context data sets further comprises a second context data set which includes a second set of visual enhancements and a second context for selecting the second set of visual enhancements, the AI engine is further configured to select, based on the source content and the plurality of context data sets, the second set of visual enhancements, and apply the selected second set of visual enhancements to the source content to generate a second visual enhancement suggestion for the source content; and the method further comprises extracting, from the AI engine, the second visual enhancement suggestion; and causing the second visual enhancement suggestion to be displayed via the display of the user device.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for generating visual enhancement suggestions for source content, the system comprising:
    a processor; and
    a computer-readable medium in communication with the processor, the computer-readable medium comprising instructions that, when executed by the processor, cause the processor to control the system to perform:
        storing, in a data storage, a plurality of visual enhancement data sets, each visual enhancement data set comprising a set of visual enhancements and a context for selecting the set of visual enhancements;
        receiving, from a user device, the source content including (1) source content data representing visual content created by a user of the user device and (2) source attribute data containing contextual information of the source content data;
        providing, to an artificial intelligence (AI) engine, the received source content, the AI engine configured to:
            select, based on contextual proximity between the source content and each visual enhancement data set, a first visual enhancement data set, which is one of the plurality of visual enhancement data sets; and
            apply, to the user-created visual content, the sets of visual enhancements of the selected first visual enhancement data, to generate a visual enhancement suggestion showing the source content modified to include the sets of visual enhancements of the selected first visual enhancement data;
        extracting, from the AI engine, the visual enhancement suggestion; and
        causing the visual enhancement suggestion to be displayed via a display of the user device.

2. The system of claim 1, wherein the instructions, when executed by the processor, further cause the processor to control the system to perform training, based on previous enhancement activity data, a machine learning (ML) engine to generate the plurality of visual enhancement data sets.

3. The system of claim 2, wherein the previous enhancement activity data comprises a plurality of content data sets that have been previously visually enhanced, each content data set comprising content data, attribute data and one or more of the visual enhancements applied to the content data.

4. The system of claim 3, wherein, for training the ML engine, the instructions, when executed by the processor, further cause the processor to control the system to perform:
    providing, to the ML engine, the previous enhancement activity data, wherein the ML engine is configured to:
        identify, from the plurality of content data sets, a plurality of contextual relationships between the content and attribute data and the one or more visual enhancements applied to the content data; and
        generate, based on the identified contextual relationships, the plurality of visual enhancement data sets, each visual enhancement data set comprising a set of visual enhancements and a context for selecting the set of visual enhancements; and
    extracting, from the ML engine, the plurality of visual enhancement data sets.

5. The system of claim 1, wherein the source attribute data comprises at least one of user information, content information, location information and language information.

6. The system of claim 1, wherein the source content data comprises one or more visual elements, each visual element comprising a text, image or video.

7. The system of claim 1, wherein the set of visual enhancements of each visual enhancement data set comprises at least one of:
    adding a template, document structure or color scheme;
    adding one or more visual elements, animations or motion effects;
    sequencing rendering of the animations or motion effects;
    changing a font type or font size; and
    changing a shape, size, color or location of an existing visual element.

8. The system of claim 1, wherein the instructions, when executed by the processor, further cause the processor to control the system to perform receiving a user input requesting to provide a visual enhancement suggestion for the source content.

9. The system of claim 1, wherein the instructions, when executed by the processor, further cause the processor to control the system to perform causing a message to be displayed via the display of the user device, the message offering to generate a visual enhancement suggestion for the source content.

10. A non-transitory computer-readable medium comprising instructions that, when executed by a processor, cause the processor to control a system to perform:
storing, in a data storage, a plurality of visual enhancement data sets, each visual enhancement data set comprising a set of visual enhancements and a context for selecting the set of visual enhancements;
receiving, from a user device, source content including (1) source content data representing visual content created by a user of the user device and (2) source attribute data containing contextual information of the source content data;
providing, to an artificial intelligence (AI) engine, the received source content, the AI engine configured to:
  select, based on contextual proximity between the source content and each visual enhancement data set, a first visual enhancement data set, which is one of the plurality of visual enhancement data sets; and
  apply, to the user-created visual content of the source content data, the sets of visual enhancements of the selected first visual enhancement data, to generate a visual enhancement suggestion showing the user-created source content modified to include the sets of visual enhancements of the selected first visual enhancement data;
extracting, from the AI engine, the visual enhancement suggestion; and
causing the visual enhancement suggestion to be displayed via a display of the user device.

11. A method of operating a system for generating visual enhancement suggestions for source content, the method comprising:
storing, in a data storage, a plurality of visual enhancement data sets, each visual enhancement data set comprising a set of visual enhancements and a context for selecting the set of visual enhancements;
receiving, from a user device, the source content including (1) source content data representing visual content created by a user of the user device and (2) source attribute data containing contextual information of the source content data;
providing, to an artificial intelligence (AI) engine, the received source content, the AI engine configured to:
  select, based on contextual proximity between the source content and each visual enhancement data set, a first visual enhancement data set, which is one of the plurality of visual enhancement data sets; and
  apply, to the user-created visual content of the source content data, the sets of visual enhancements of the selected first visual enhancement data, to generate a first visual enhancement suggestion showing the user-created source content modified to include the sets of visual enhancements of the selected first visual enhancement data;
extracting, from the AI engine, the first visual enhancement suggestion; and
causing the first visual enhancement suggestion to be displayed via a display of the user device.

12. The method of claim 11, further comprising training, based on previous enhancement activity data, a machine learning (ML) engine to generate the plurality of visual enhancement data sets.

13. The method of claim 12, wherein the previous enhancement activity data comprises a plurality of content data sets that have been previously visually enhanced, each content data set comprising content data, attribute data and one or more the visual enhancements applied to the content data.

14. The method of claim 13, wherein training the ML engine comprises:
providing, to the ML engine, the previous enhancement activity data, wherein the ML engine is configured to:
  identify, from the plurality of content data sets, a plurality of contextual relationships between the content and attribute data and the one or more visual enhancements applied to the content data, and
  generate, based on the identified contextual relationships, the plurality of visual enhancement data sets, each visual enhancement data set comprising a set of visual enhancements and a context for selecting the set of visual enhancements; and
extracting, from the ML engine, the plurality of visual enhancement data sets.

15. The method of claim 11, wherein the source attribute data comprises at least one of user information, content information, location information and language information.

16. The system of claim 11, wherein the source content data comprises one or more visual elements, each visual element comprising a text, image or video.

17. The method of claim 11, wherein the set of visual enhancements of each visual enhancement set comprises at least one of:
adding a template, document structure or color scheme;
adding one or more visual elements, animations or motion effects;
sequencing rendering of the animations or motion effects;
changing a font type or font size; and
changing a shape, size, color or location of an existing visual element.

18. The method of claim 11, further comprising receiving a user input requesting to provide a visual enhancement suggestion for the source content.

19. The method of claim 11, further comprising causing a message to be displayed via the display of the user device, the message offering to generate a visual enhancement suggestion for the source content.

20. The method of claim 11, wherein:
the plurality of visual enhancement data sets further comprises a second visual enhancement data set which includes a second set of visual enhancements and a second context for selecting the second set of visual enhancements,
the AI engine is further configured to:
  select, based on contextual proximity between the source content and each visual enhancement data set, the second set of visual enhancements, and
  apply, to the user-created visual content of the source content data, the sets of visual enhancements of the selected second visual enhancement data set, to generate a second visual enhancement suggestion showing the user-created visual content modified to include the sets of visual enhancements of the selected second visual enhancement data; and the method further comprises:
    extracting, from the AI engine, the second visual enhancement suggestion; and
    causing the second visual enhancement suggestion to be displayed via the display of the user device.

* * * * *